US008681369B2

(12) United States Patent
Yokota (10) Patent No.: US 8,681,369 B2
(45) Date of Patent: Mar. 25, 2014

(54) IMAGE PROCESSING APPARATUS, IMAGE FORMING APPARATUS AND IMAGE PROCESSING METHOD (75) Inventor: Hiroshi Yokota, Osaka (JP)

(73) Assignee: Kyocera Mita Corporation (JP)

( * ) Notice: Subject to any disclaimer, the term of this patent is extended or adjusted under 35 U.S.C. 154(b) by 316 days.

(21) Appl. No.: 13/302,354

(22) Filed: Nov. 22, 2011

(65) Prior Publication Data
US 2012/0133986 A1    May 31, 2012

(30) Foreign Application Priority Data

Nov. 25, 2010  (JP) ................................. 2010-262316

(51) Int. Cl.
G06K 15/00 (2006.01)
G06F 3/12 (2006.01)
H04N 1/00 (2006.01)
G06K 9/42 (2006.01)

(52) U.S. Cl.
USPC ........ 358/1.16; 358/1.17; 358/1.15; 358/404; 358/406; 358/115; 382/139; 382/254

(58) Field of Classification Search
USPC ...................... 358/1.17, 1.15, 1.16, 404, 406; 382/139, 254
See application file for complete search history.

(56) References Cited

U.S. PATENT DOCUMENTS

| 5,798,843 | A  | * | 8/1998 | Yamamoto et al. | ........... 358/404 |
| 6,002,452 | A  | * | 12/1999 | Morgan | ........................ 348/742 |
| 6,411,394 | B1 | * | 6/2002 | Nakamura et al. | ........... 358/1.15 |
| 6,441,915 | B1 | * | 8/2002 | Imaizumi et al. | ............ 358/1.15 |
| 7,411,694 | B2 | * | 8/2008 | Nomizu | ....................... 358/1.16 |
| 7,961,930 | B2 | * | 6/2011 | Prakash | ........................ 382/139 |
| 8,028,235 | B2 | * | 9/2011 | Lin | ............................... 715/722 |

FOREIGN PATENT DOCUMENTS

JP            2010-41383          2/2010

* cited by examiner

Primary Examiner — Akwasi M Sarpong
(74) Attorney, Agent, or Firm — Gerald E. Hespos; Michael J. Porco; Matthew T. Hespos (57) ABSTRACT An image processing apparatus has a line memory for writing and reading image data of one line. A write/read controller controls writing and reading the image data of one line in and from the line memory. A white line determiner determines whether an image corresponding to image data of one line being written in the line memory is a white line. An image processor performs specified image processing on the image data of one line read from the line memory by the write/read controller. An image processing controller generates an operation clock used in the image processor and causes the image processor to perform the specified image processing for the image data of one line determined not to be a white line and stops generating the operation clock and reads white data from a white data storage for the image data of one line determined to be a white line.

9 Claims, 6 Drawing Sheets

IMAGE PROCESSING APPARATUS, IMAGE FORMING APPARATUS AND IMAGE PROCESSING METHOD

BACKGROUND OF THE DISCLOSURE

1. Field of the Invention

The present disclosure relates to an image processing apparatus with a line memory, an image forming apparatus with such an image processing apparatus and an image processing method.

2. Description of the Related Art

A line sensor is provided in an image processing apparatus such as a digital complex machine and generates image data of one page by repeatedly reading one page line by line in a main scanning direction. A line memory is a memory for storing image data of one line.

There has been proposed an image processing apparatus which determines whether or not image data of one page is white image data band by band, compresses the bands determined not to be the white image data, does not compress the bands determined to be the white image data and reads compressed white image data stored beforehand in a storage. According to this image processing apparatus, image processing can be speeded up since the bands determined to be the white image data are not compressed.

Properties required for image processing apparatuses include low power consumption besides high-speed processing. Accordingly, when white image data are not compressed as in the above image processing apparatus, it is preferable if power consumption can be reduced utilizing this.

SUMMARY OF THE DISCLOSURE

An object of the present disclosure is to provide an image processing apparatus capable of reducing power consumption, an image forming apparatus including such an image processing apparatus and an image processing method.

In order to achieve this object, one aspect of the present disclosure is directed to an image processing apparatus, comprising a line memory capable of writing and reading image data of one line; a write/read controller for controlling writing and reading of the image data of one line in and from the line memory; a white line determiner for determining whether or not an image corresponding to the image data of one line being written in the line memory by the write/read controller is a white line, an image processor capable of performing a specified image processing on the image data of one line read from the line memory by the write/read controller, a white data storage storing white data, and an image processing controller for controlling to generate an operation clock used in the image processor and cause the image processor to perform the specified image processing for the image data of one line determined not to be a white line by the white line determiner and controlling to stop generating the operation clock and read the white data from the white data storage for the image data of one line determined to be a white line by the white line determiner.

In order to achieve the above object, another aspect of the present disclosure is directed to an image forming apparatus, comprising an image processing apparatus according to the one aspect of the disclosure, and an image forming unit for forming an image on a sheet using image data of one page which is a collection of image data of a plurality of lines processed in the image processing apparatus.

In order to achieve the above object, still another aspect of the present disclosure is directed to an image processing method, comprising a first step of determining whether or not an image corresponding to image data of one line being written in a line memory is a white line, a second step of writing the image data of one line in the line memory, a third step of reading the image data of one line written in the line memory in the second step and performing a specified image processing on the read image data of one line using an operation clock when the image is judged not to be a white line in the first step, and a fourth step of causing the specified image processing not to be performed on the image data of one line written in the line memory in the second step by stopping the generation of the operation clock and, instead, reading white data as the image data of one line when the image is judged to be a white line in the first step.

Objects, features and advantages of the present disclosure will become more apparent upon reading the following detailed description along with the accompanying drawings.

DETAILED DESCRIPTION OF THE PREFERRED EMBODIMENTS

Figure 1:
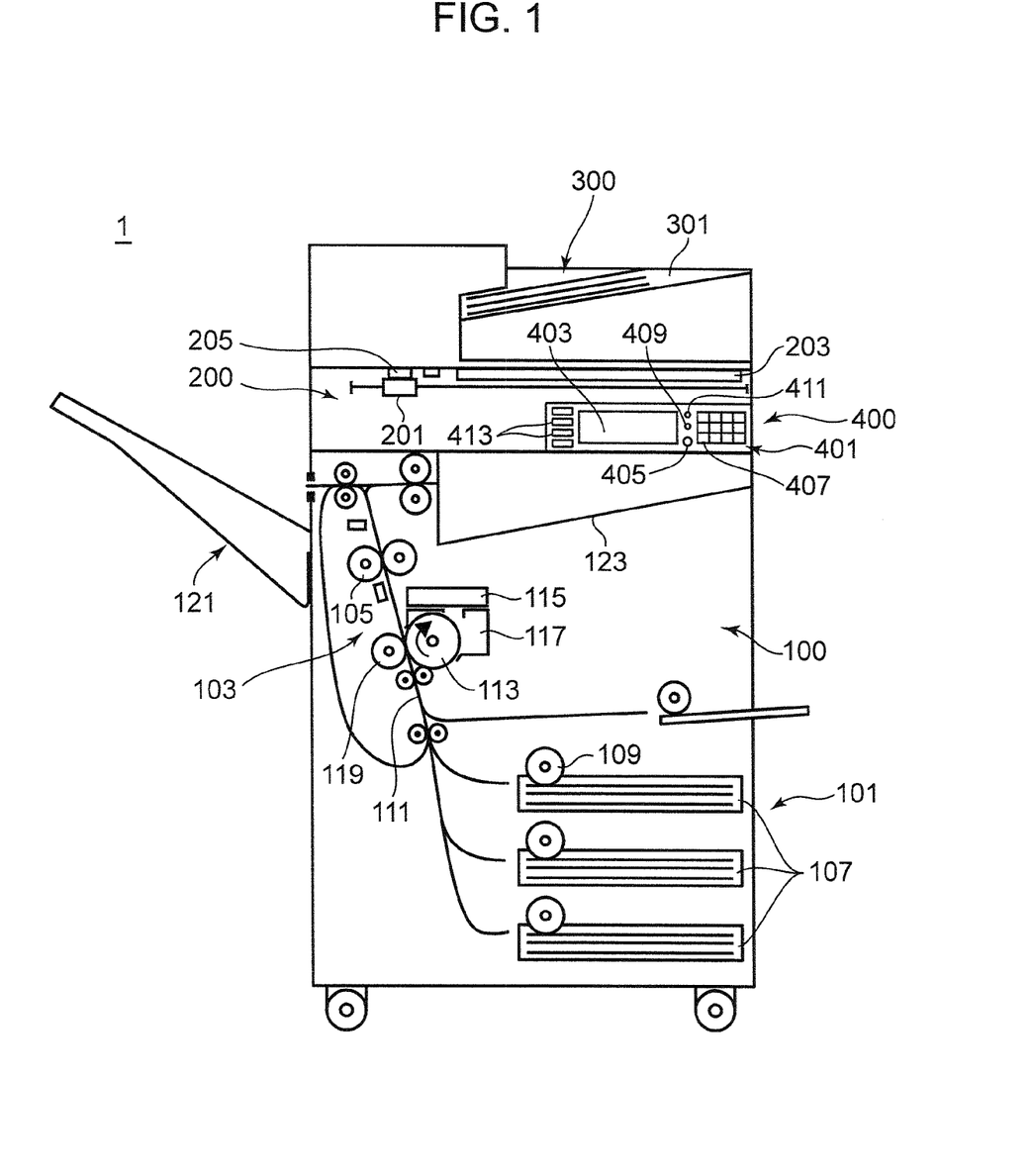
FIG. 1 is a diagram schematically showing the internal structure of an image forming apparatus including an image processing apparatus according to one embodiment of the disclosure.

Hereinafter, an embodiment of the present disclosure is described in detail with reference to the drawings. FIG. 1 is a diagram schematically showing the internal structure of an image forming apparatus 1 including an image processing apparatus according to one embodiment of the present disclosure. The image forming apparatus 1 can be applied, for example, to a digital complex machine having copy, printer, scanner and facsimile functions. The image forming apparatus 1 includes an apparatus main body 100, a document reader 200 arranged on the apparatus main body 100, a document feeder 300 arranged on the document reader 200 and an operation unit 400 arranged on the front surface of an upper part of the apparatus main body 100.

The document feeder 300 functions as an automatic document feeder and can successively feed a plurality of documents placed on a document placing portion 301 to the document reader 200.

The document reader 200 includes a carriage 201 carrying an exposure lamp and the like, a document table 203 made of a transparent member such as glass, an unillustrated CCD (Charge Coupled Device) sensor and a document reading slit 205. The document reader 200 divides a document into a plurality of lines along a main scanning direction, reads the document while relatively moving the document in the sub scanning direction, and successively outputs image data of one line to a line memory 51 to be described later. In the case of reading a document placed on the document table 203, the document is read by the CCD sensor by moving the carriage 201 in a longitudinal direction of the document table 203. On the contrary, in the case of reading a document fed from the document feeder 300, the document fed from the document feeder 300 is read through the document reading slit 205 by the CCD sensor by moving the carriage 201 to a position facing the document reading slit 205. The CCD sensor outputs the read document as image data.

The apparatus main body 100 includes a sheet storage unit 101, an image forming unit 103 and a fixing unit 105. The sheet storage unit 101 is arranged in a bottommost part of the apparatus main body 100 and includes sheet trays 107 capable of storing stacks of sheets. The uppermost sheet in the sheet stack stored in each sheet tray 107 is fed to a sheet conveyance path 111 by driving a pickup roller 109. The sheet is conveyed to the image forming unit 103 via the sheet conveyance path 111.

The image forming unit 103 forms a toner image on a sheet conveyed thereto. The image forming unit 103 includes a photoconductive drum 113, an exposure unit 115, a developing unit 117 and a transfer unit 119. The exposure unit 115 generates light modulated in correspondence with image data (image data output from the document reader 200, image data transmitted from a personal computer, facsimile-received image data or the like) and irradiates the light to the uniformly charged circumferential surface of the photoconductive drum 113. In this way, an electrostatic latent image corresponding to the image data is formed on the circumferential surface of the photoconductive drum 113. By supplying toner from the developing unit 117 to the circumferential surface of the photoconductive drum 113 in this state, a toner image corresponding to the image data is formed on the circumferential surface. This toner image is transferred to a sheet conveyed from the sheet storage unit 101 described above by the transfer unit 119.

The sheet having the toner image transferred thereto is fed to the fixing unit 105. In the fixing unit 105, heat and pressure are applied to the toner image and the sheet, whereby the toner image is fixed to the sheet. The sheet is discharged to a stack tray 121 or a discharge tray 123.

The operation unit 400 includes an operation key unit 401 and a display unit 403. The display unit 403 has a touch panel function and a screen with soft keys is displayed thereon. A user does setting necessary to perform the copy function or the like by operating the soft keys while viewing the screen.

The operation key unit 401 includes operation keys which are hard keys. Specifically, the operation key unit 401 includes a start key 405, a numerical pad 407, a stop key 409, a reset key 411, function switching keys 413 for switching the function among the copy, printer, scanner and facsimile functions, and the like.

The start key 405 is a key for starting an operation such as a copy operation or facsimile transmission. The numerical pad 407 is an assembly of keys used to input numbers such as the number of copies to be made, facsimile numbers and the like. The stop key 409 is a key for stopping the copy operation or the like halfway. The reset key 411 is a key for returning a set content to an initially set state.

The function switching keys 413 include a copy key, a transmit key and the like and are used to switch the function among the copy function, the transmit function and the like. If the copy key is operated, an initial screen for the copy operation is displayed on the display unit 403. If the transmit key is operated, an initial screen for facsimile transmission and mail transmission is displayed on the display unit 403.

Figure 2:
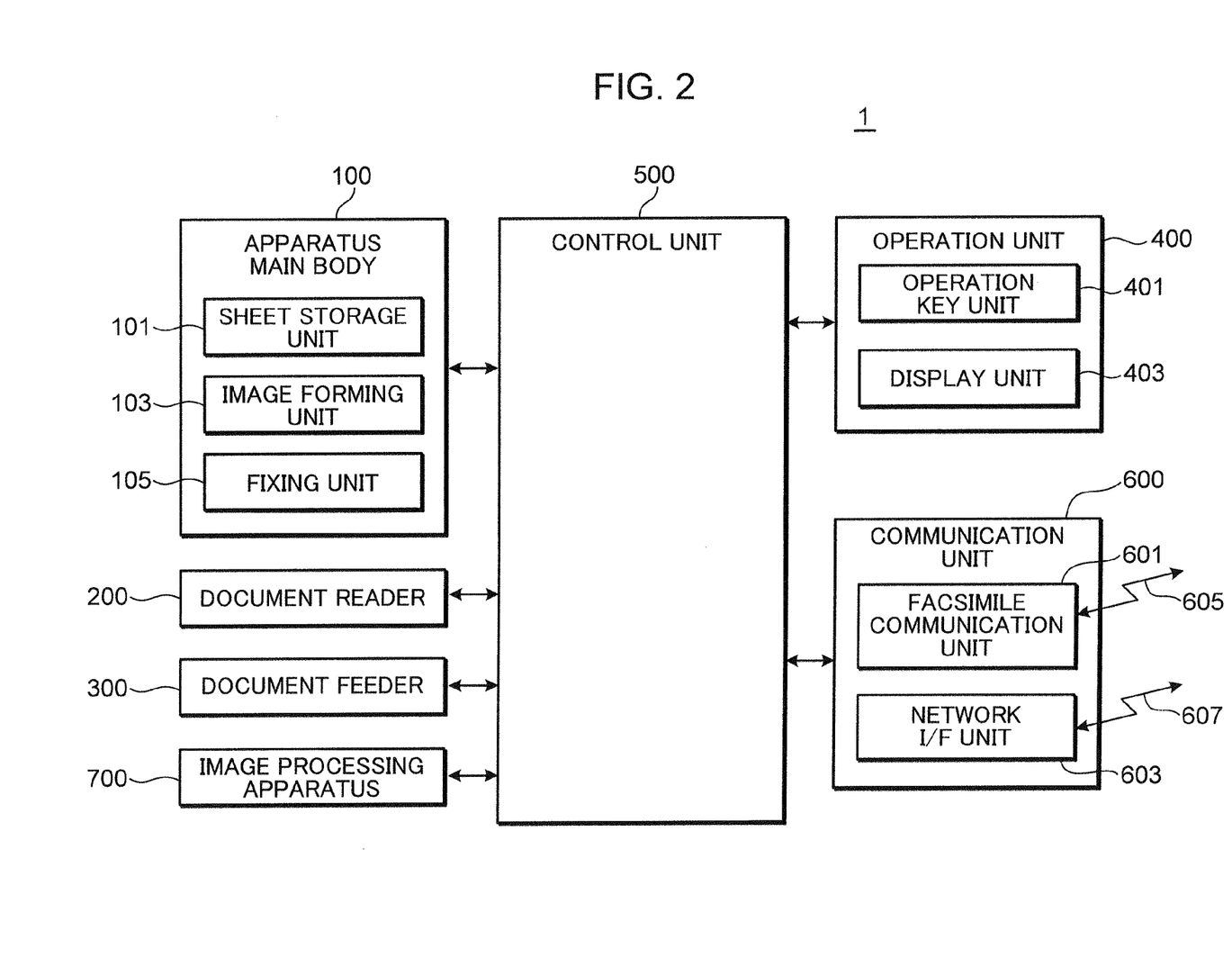
FIG. 2 is a block diagram showing the construction of the image forming apparatus shown in FIG. 1.

FIG. 2 is a block diagram showing the construction of the image forming apparatus 1 shown in FIG. 1. The image forming apparatus 1 includes the apparatus main body 100, the document reader 200, the document feeder 300, the operation unit 400, a control unit 500, a communication unit 600 and an image processing apparatus 700 which are connected to each other via a bus. The apparatus main body 100, the document reader 200, the document feeder 300 and the operation unit 400 are not described here since they are already described.

The control unit 500 includes a CPU (Central Processing Unit), a ROM (Read Only Memory), a RAM (Random Access Memory), an image memory and the like. The CPU executes a control necessary to operate the image forming apparatus 1 on the above hardware constituting the image forming apparatus 1. The ROM stores software necessary to control the operation of the image forming apparatus 1. The RAM is used to temporarily store data generated at the time of executing the software and store application software and the like. The image memory is for temporarily storing image data (image data output from the document reader 200, image data transmitted from a personal computer, facsimile-received image data or the like).

The communication unit 600 includes a facsimile communication unit 601 and a network I/F unit 603. The facsimile communication unit 601 includes an NCU (Network Control Unit) for controlling connection of a telephone line to a destination facsimile machine and a modulation/demodulation circuit for modulating and demodulating a signal for facsimile communication. The facsimile communication unit 601 is connected to a telephone line 605.

The network I/F unit 603 is connected to a LAN (Local Area Network) 607. The network I/F unit 603 is a communication interface circuit for carrying out communication with terminal units such personal computers connected to the LAN 607.

Figure 3:
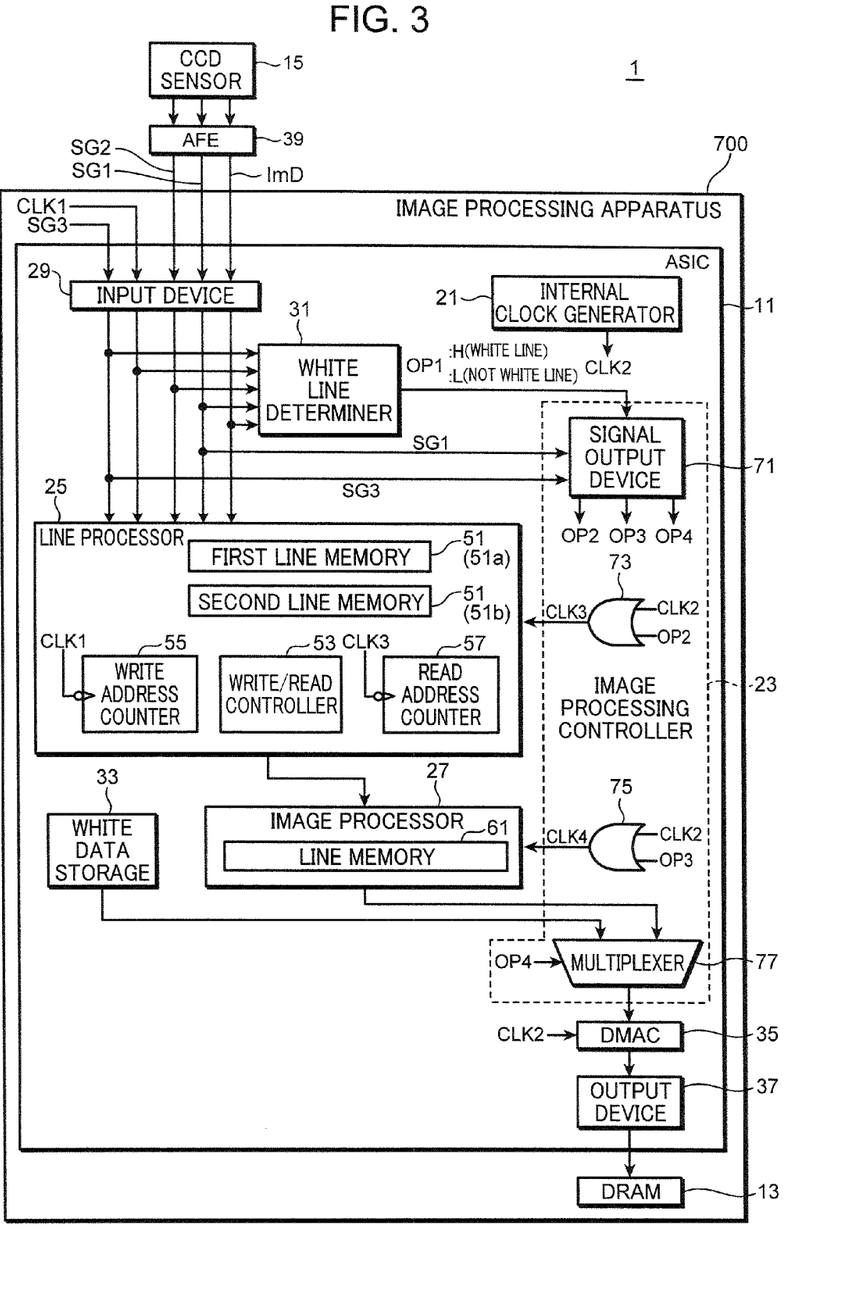
FIG. 3 is a block diagram showing the construction of the image processing apparatus according to the embodiment.

The image processing apparatus 700 is described. FIG. 3 is a block diagram showing the construction of the image processing apparatus 700 according to this embodiment. The image processing apparatus 700 includes an ASIC (Application Specific Integrated Circuit) 11 and a DRAM (Dynamic Random Access Memory) 13. Image data ImD of one page generated by a CCD sensor 15 is written in the DRAM 13 after specified image processings are performed thereon in the ASIC 11. The CCD sensor 15 is provided in the document reader 200 shown in FIG. 2.

The ASIC 11 includes an internal clock generator 21, an image processing controller 23, a line processor 25, an image processor 27, an input device 29, a white line determiner 31, a white data storage 33, a DMA (Direct Memory Access) controller 35 and an output device 37.

The internal clock generator 21 generates an internal clock CLK2. The image processing controller 23 generates a read clock CLK3 and an operation clock CLK4 based on the internal clock CLK2. The read clock CLK3 is fed to the line processor 25 and used in the case of reading image data of one line written in the line memory. The operation clock CLK4 is fed to the image processor 27 and serves as a reference clock for image processing. The internal clock CLK2 serves as an operation clock of the DMA controller 35.

In an analog front end 39, various processings are performed on analog image data of one page generated by the CCD sensor 15 and digital image data ImD of one page is input to the input device 29. A sub scanning synchronization signal SG1 and a main scanning synchronization signal SG2 generated in the document reader 200 and an external clock CLK1 and an image valid section signal SG3 generated in the image processing apparatus 700 are input to the input device 29. The input device 29 is an input interface between the ASIC 11 and the outside.

The image data ImD of one page is input to the input device 29 in the order of image data of the first line, that of the second line, that of the third line, . . . , that of the last line in synchronization with the main scanning synchronization signal SG2. The image data ImD of one page is a collection of image data of a plurality of lines.

One line is composed of a plurality of pixels. Accordingly, the image data of one line is a collection of a plurality of pixel data, i.e. first pixel data, second pixel data, third pixel data, . . . , last pixel data.

The image valid section signal SG3 is generated in synchronization with the main scanning synchronization signal SG2 in the image processing apparatus 700 and indicates a section of one main scanning line where an image is valid. The image is valid when the image valid section signal SG3 is in an assert state (i.e. in an active state), whereas the image is invalid when the image valid section signal SG3 is in a negate state (i.e. in an inactive state). The image valid section signal SG3 is also called a MRE (Memory Read Enable) signal.

The sub scanning synchronization signal SG1 is a signal indicating a section in the sub scanning direction where the image is valid. The image is valid when the sub scanning synchronization signal SG1 is in an assert state while being invalid when it is in a negate state.

The image data ImD of one page, the sub scanning synchronization signal SG1, the main scanning synchronization signal SG2, the external clock CLK1 and the image valid section signal SG3 input to the input device 29 are fed to the line processor 25. Since the image processings are performed on the image data line by line in the image processor 27, the line processor 25 reads and writes the image data ImD of one page line by line.

The line processor 25 includes a first line memory 51a, a second line memory 51b, a write/read controller 53, a write address counter 55 and a read address counter 57.

The first and second line memories 51a, 51b are realized, for example, by SRAMs (Static Random Access Memories). Image data of one line is read from and written in the first and second line memories 51a, 51b. If the first line memory 51a is readable, the second line memory 51b is writable. Conversely, if the first line memory 51a is writable, the second line memory 51b is readable. Reading of image data of one line and writing of image data of line are performed in parallel. Unless it is necessary to distinguish the first and second line memories 51a, 51b, they are written as line memories 51.

The write/read controller 53 switches the readable line memory 51 and the writable line memory 51 line by line out of the two line memories every time the main scanning synchronization signal SG2 is input to the line processor 25. The write/read controller 53 controls to read the image data of one line written in the readable line memory 51 and transfer it to the image processor 27. The write/read controller 53 controls to write image data of the next line in the writable line memory 51.

The external clock CLK1 is input to a clock terminal of the write address counter 55. Every time the external clock CLK1 is input to the clock terminal, the write address counter 55 counts up and generates an address. This address is an address of an area where one pixel data is written (i.e. memory cell) in the writable line memory 51.

The read clock CLK3 is used for a control to read the image data of one line written in the readable line memory 51. The read clock CLK3 is input to a clock terminal of the read address counter 57. Every time the read clock CLK3 is input to the clock terminal, the read address counter 57 counts up and generates an address. This address is an address of an area where one pixel data is read (i.e. memory cell) in the readable line memory 51.

The image data of one line read from the line processor 25 is transferred to the image processor 27 and stored in a line memory 61 of the image processor 27. In the image processor 27, specified image processings are performed on the image data of one line. The image processings here are, for example, color correction, chromatic aberration correction, MTF (Modulation Transfer Function) correction and line correction.

The image data ImD of one page, the sub scanning synchronization signal SG1, the main scanning synchronization signal SG2, the external clock CLK1 and the image valid section signal SG3 input to the input device 29 are fed to the white line determiner 31. Using these, the white line determiner 31 determines whether or not an image corresponding to the image data of one line being written in the line memory 51 is a white line.

The white line determiner 31 counts white pixels out of the pixels constituting one line and determines that this line is a white line if the count value exceeds a predetermined threshold value. The definition of a white pixel may be such that a pixel is a white pixel if a pixel value is 255 or equal to or larger than a predetermined threshold value (e.g. 250), for example, in the case of representing the pixel in 256 gradations.

If the white line determiner 31 determines the line to be a white line, an output OP1 of the white line determiner 31 is H level. If the white line determiner 31 determines the line not to be a white line, the output OP1 of the white line determiner 31 is L level.

Figure 4:
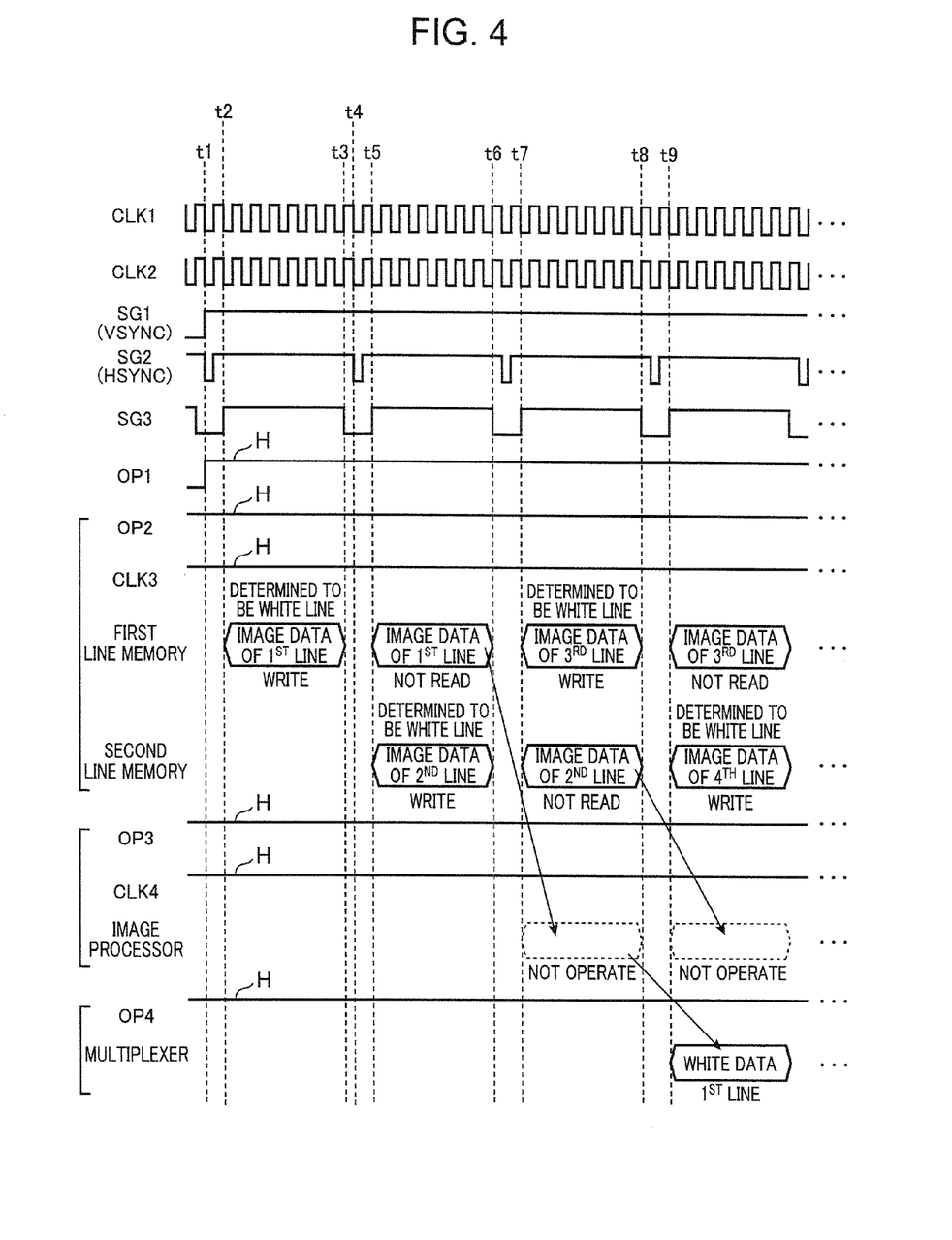
FIG. 4 is a timing chart (No. 1) showing the operation of the image processing apparatus according to the embodiment.
Figure 5:
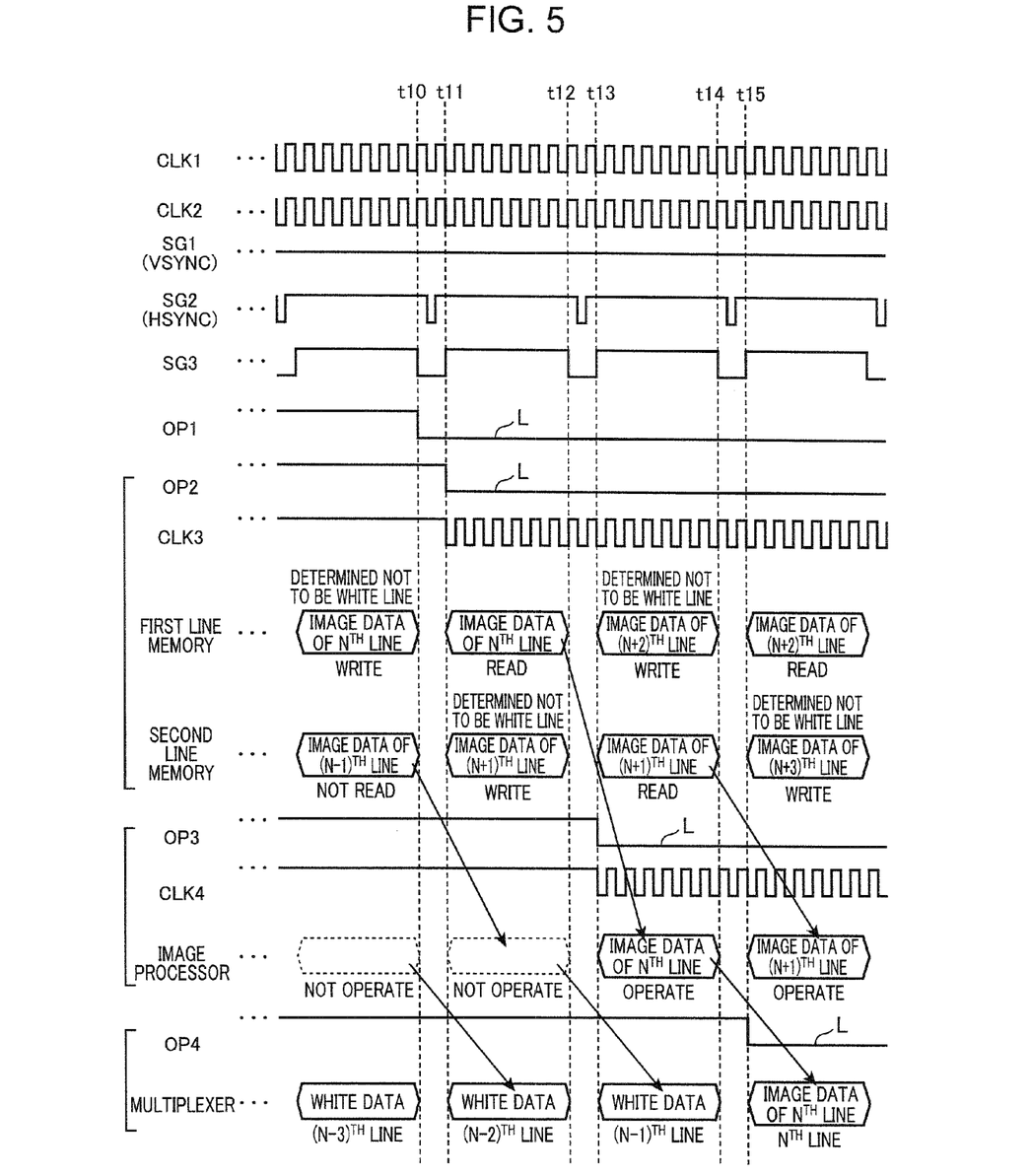
FIG. 5 is a timing chart (No. 2) showing the operation of the image processing apparatus according to the embodiment.

The output OP1 is fed to the image processing controller 23. The image processing controller 23 controls to generate the operation clock CLK4 used in the image processor 27 and cause the image processor 27 to perform the specified image processings for the image data of one line determined not to be a white line by the white line determiner 31. The image processing controller 23 controls to stop the generation of the operation clock CLK4 used in the image processor 27 and read the white data from the white data storage 33 for the image data of one line determined to be a white line by the white line determiner 31. The image processing controller 23 includes a signal output device 71, OR gates 73, 72b and a multiplexer 77. In the image processing controller 23, levels of outputs OP2, OP3 and OP4 are switched in accordance with the output OP1. The output OP2 of H level is an example of a first mask signal, and the output OP3 of H level is an example of a second mask signal. FIGS. 4 and 5 are timing charts showing the operation of the image processing apparatus 700. The output OP1 and the like are described with reference to FIGS. 3 to 5.

When the sub scanning synchronization signal SG1 input to the white line determiner 31 is switched from L level to H level (time t1), i.e. the image processing for the image data of one page starts in the image processing apparatus 700, the level of the output OP1 is switched to H level.

The image data of one line are successively fed to the line processor 25, the image processor 27, the multiplexer 77 and the DMA controller 35 after it is determined in the white line determiner 31 whether or not each of these image data is a white line. For the image data of one line determined not to be a white line in the white line determiner 31, the values of the outputs OP2, OP3 and OP4 are adjusted (times t11, t13 and t15 in FIG. 5) in accordance with processing timings in the above respective devices.

The output OP2 and the internal clock CLK2 are input to the OR gate 73. If the output OP2 is H level (white line), the output of the OR gate 73 is H level. If the output OP2 is L level (not a white line), the read clock CLK3 is output from the OR gate (time t11). That is, the OR gate 73 functions as a first OR gate, outputs the internal clock CLK2 as the read clock CLK3 unless the first mask signal is input (i.e. if the output OP2 of L level is input) and does not output the read clock CLK3 if the first mask signal is input (i.e. the output OP2 of H level is input).

The output OP3 and the internal clock CLK2 are input to the OR gate 75. If the output OP3 is H level (white line), the output of the OR gate 75 is H level. If the output OP3 is L level (not a white line), the operation clock CLK4 is output from the OR gate 75 (time t13). That is, the OR gate 75 functions as a second OR gate, outputs the internal clock CLK2 as the operation clock CLK4 unless the second mask signal is input (i.e. if the output OP3 of L level is input) and does not output the operation clock CLK4 if the second mask signal is input (i.e. the output OP3 of H level is input).

The output OP4 serves as a signal for switching the output of the multiplexer 77. If the output OP4 is H level (white line), the multiplexer 77 outputs the white data read from the white data storage 33. For the case where the image corresponding to the image data of one line is a white line, the white data having the image processings performed thereon in the image processor 27 is stored in the white data storage 33 beforehand. If the white line determiner 31 determines the image corresponding to the image data of one line to be a white line, the read clock CLK3 and the operation clock CLK4 are not generated. Thus, the image processings are not performed on this image data in the image processor 27, wherefore the white data is output instead.

If the output OP4 is L level (not a white line) (time t15), the multiplexer 77 outputs the image data of one line having the image processings performed thereon in the image processor 27.

The data output from the multiplexer 77 is transferred to the DRAM 13 via the output device 37 and written in the DRAM 13 by the DMA controller 35. The output device 37 is an output interface between the ASIC 11 and the outside.

Figure 6:
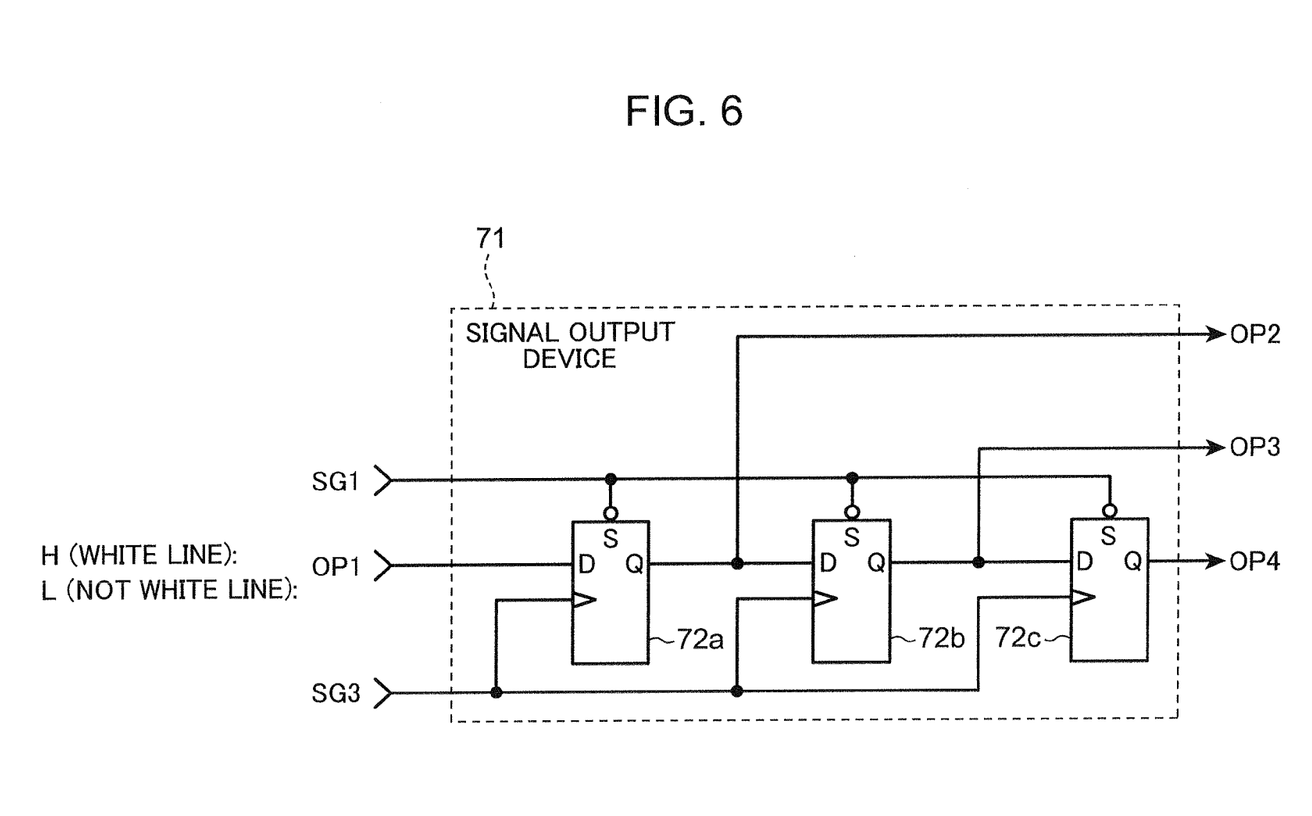
FIG. 6 is a circuit diagram of a signal output device.

The signal output device 71 is described. FIG. 6 is a circuit diagram of the signal output device 71. The signal output device 71 is a shift register including three D flip-flops 72a, 72b and 72c. The image valid section signal SG3 is input to clock terminals of the D flip-flops 72a, 72b and 72c. The output OP1 is input to an input terminal of the D flip-flop 72a. The sub scanning synchronization signal SG1 is input to set terminals of the D flip-flops 72a, 72b and 72c.

An output from the D flip-flop 72a in the first stage becomes the output OP2, that from the D flip-flop 72b in the second stage becomes the output OP3 and that from the D flip-flop 72c in the third stage becomes the output OP4.

Next, the operation of the image processing apparatus 700 is described mainly using FIGS. 4 and 5. There is described an exemplary case where image data of the first to (N−1)th lines out of image data ImD of one page correspond to a leading margin of a document of one page.

[Time t1]

If the sub scanning synchronization signal SG1 is in L level (negate state), a L-level signal is input to the set terminals of the D flip-flops 72a, 72b and 72c shown in FIG. 6. Accordingly, the D flip-flops 72a, 72b and 72c are set, wherefore the output OP2 from the D flip-flop 72a, the output OP3 from the D flip-flop 72b and the output OP4 from the D flip-flop 72c respectively become H level. If the output OP2 is H level, the image processing controller 23 stops generating the read clock CLK3. If the output OP3 is H level, the image processing controller 23 stops generating the operation clock CLK4.

At time t1, the sub scanning synchronization signal SG1 is switched from L level to H level (assert state). This causes the output OP1 of the white line determiner 31 to be switched from L level to the H level.

Further, at time t1, the main scanning synchronization signal SG2 of L level corresponding to the image data of the first line is input to the line processor 25. The write/read controller 53 sets the first line memory 51a to be writable and the second line memory 51b to be readable.

[Time t2]

The image valid section signal SG3 is switched to H level. The write/read controller 53 controls to write the image data of the first line in the first line memory 51a. The write/read controller 53 continuously controls to write in the first line memory 51a until the image valid section signal SG2 is switched to L level. Writing means overwriting. Data stored in the second line memory 51b is indefinite. Since the read clock CLK3 is not generated, no data is read from the second line memory 51b.

[Time t3]

The image valid section signal SG3 is switched to L level. The write/read controller 53 finishes the control to write the image data of the first line in the first line memory 51a. The white line determiner 31 determines the image corresponding to the image data of the first line to be a white line. Thus, the white line determiner 31 keeps the output OP1 of H level, wherefore the image processing controller 23 continues not to generate the read clock CLK3 and the operation clock CLK4.

[Time t4]

The main scanning synchronization signal SG2 of L level corresponding to the image data of the second line is input to the line processor 25. The write/read controller 53 sets the first line memory 51a to be readable and the second line memory 51b to be writable.

[Time t5]

Since the image valid section signal SG3 is switched to H level, the write/read controller 53 controls to write the image data of the second line in the second line memory 51b. Since the read clock CLK3 is not generated in the image processing controller 23, the image data of the first line is not read from the first line memory 51a.

[Time t6]

The image valid section signal SG3 is switched to L level. The write/read controller 53 finishes the control to write the image data of the second line in the second line memory 51b. Since the white line determiner 31 determines the image corresponding to the image data of the second line to be a white line, the white line determiner 31 keeps the output OP1 of H level. Thus, the image processing controller 23 continues not to generate the read clock CLK3 and the operation clock CLK4.

[Time t7]

The image valid section signal SG3 is switched to H level. The write/read controller 53 controls to write the image data of the third line in the first line memory 51a. Since the read clock CLK3 is not generated, the image data of the second line is not read from the second line memory 51b. Further, since the operation clock CLK4 is not generated, the image processor 27 does not operate.

[Time t8]

The image valid section signal SG3 is switched to L level. The write/read controller 53 finishes the control to write the image data of the third line in the first line memory 51a. The white line determiner 31 determines the image corresponding to the image data of the third line to be a white line. Thus, it is continued not to generate the read clock CLK3 and the operation clock CLK4.

[Time t9]

The image valid section signal SG3 is switched to H level. The write/read controller 53 controls to write the image data of the fourth line in the second line memory 51b. Since the read clock CLK3 is not generated, the image data of the third line is not read from the first line memory 51a. Further, since the operation clock CLK4 is not generated, the image processor 27 does not operate.

Since the output OP4 is H level, the multiplexer 77 selects the white data storage 33. Accordingly, the white data stored beforehand in the white data storage 33 is output as the image data of the first line from the multiplexer 77. Then, by the DMA controller 35, the white data is written in the memory cells allotted to the image data of the first line out of the memory cells of the DRAM 13. Thereafter, the white data stored beforehand in the white data storage 33 is output from the multiplexer 77 also for image data of the second to $(N-1)^{th}$ lines and written in the memory cells allotted to the image data of these lines out of the memory cells of the DRAM 13.

[Time t10]

The image valid section signal SG3 is switched to L level. The write/read controller 53 finishes the control to write the image data of the $N^{th}$ line in the first line memory 51a. The white line determiner 31 determines the $N^{th}$ line not to be a white line. This causes the white line determiner 31 to switch the output OP1 to L level, wherefore an L-level signal is input to the input terminal of the D flip-flop 72a shown in FIG. 6. On the other hand, since the outputs OP2, OP3 continue to be H level, the image processing controller 23 continues not to generate the read clock CLK3 and the operation clock CLK4.

[Time t11]

The image valid section signal SG3 is switched to H level. The write/read controller 53 controls to write the image data of the $(N+1)^{th}$ line in the second line memory 51b. Since the output OP1 is L level, the output OP2 is switched to L level in synchronization with the switch of the image valid section signal SG3 to H level. Since this causes the read clock CLK3 to be generated, the write/read controller 53 controls to read the image data of the $N^{th}$ line from the first line memory 51a. Note that since the operation clock CLK4 is not generated, the image processor 27 does not operate. Since the output OP4 is H level, the multiplexer 77 selects the white data storage 33. Accordingly, the white data is output as the image data of the $(N-2)^{th}$ line from the multiplexer 77.

[Time t12]

The image valid section signal SG3 is switched to L level. The write/read controller 53 finishes the control to write the image data of the $(N+1)^{th}$ line in the second line memory 51b. Since determining the $(N+1)^{th}$ line not to be a white line, the white line determiner 31 keeps the output OP1 of L level.

[Time t13]

The image valid section signal SG3 is switched to H level. The write/read controller 53 controls to write the image data of the (N+2)th line in the first line memory 51a and to read the image data of the (N+1)th from the second line memory 51b.

Since the output OP1 is L level, the output OP3 is switched to L level in synchronization with the switch of the image valid section signal SG3 to H level. Since the operation clock CLK4 is generated, the specified image processings are performed on the image data of the $N^{th}$ line read from the first line memory 51a in the image processor 27.

[Time t14]

The image valid section signal SG3 is switched to L level. The write/read controller 53 finishes the control to write the image data of the $(N+2)^{th}$ line in the first line memory 51a. Since determining the $(N+2)^{th}$ line not to be a white line, the white line determiner 31 keeps the output OP1 of L level.

[Time t15]

The image valid section signal SG3 is switched to H level. The write/read controller 53 controls to write the image data of the $(N+3)^{th}$ line in the second line memory 51b and to read the image data of the $(N+2)^{th}$ from the first line memory 51a.

Since the output OP1 is L level, the output OP4 is switched to L level in synchronization with the switch of the image valid section signal SG3 to H level. Since the output OP4 is L level, the multiplexer 77 selects the image processor 27. Accordingly, the image data of the Nth line having the image processings performed thereon in the image processor 27 is output from the multiplexer 77.

Thereafter, unless the image of one line is a white line, the image data of this line having the image processings performed thereon in the image processor 27 is output from the multiplexer 77. If the image of one line is a white line, the white data stored in the white data storage 33 is output from the multiplexer 77. Accordingly, if a document is a character document, no image processings are performed on image data of one line corresponding to line spaces and a trailing end margin in the image processor 27 and white data is output.

As described above, the image processing controller 23 generates the read clock CLK3 for the image data of one line determined not to be a white line by the white line determiner 31, and stops generating the read clock CLK3 for the image data of one line determined to be a white line by the white line determiner 31. The write/read controller 53 controls to read the image data of one line determined not to be a white line by the white line determiner 31 from the line memory 51 using the read clock CLK3, and does not control to read the image data of one line determined to be a white line by the white line determiner 31 from the line memory 51.

Main effects of this embodiment are described. According to this embodiment, if the image corresponding to the image data of one line is determined to be a while line in the white line determiner 31, the generation of the operation clock CLK4 used in the image processor 27 is stopped. In this way, the image data of this line is neither written in nor read from the line memory 61 and no image processings are performed thereon in the image processor 27. Thus, the white data is read from the white data storage 33 instead. In this way, if the image corresponding to the image data of one line is determined to be a white line, the generation of the operation clock CLK4 used in the image processor 27 is stopped for the image data of this line. Therefore, lower power consumption of the image processing apparatus 700 can be realized. Particularly, since writing and reading are stopped in the line memory 61 by stopping the operation clock CLK4, power consumption can be reduced.

According to this embodiment, if the image corresponding to the image data of one line is determined to be a white line, no image processings are performed on the image data of this line. Thus, reading of the image data of this line is prevented by stopping the generation of the read clock CLK3. Since the generation of the read clock CLK3 is stopped, lower power consumption of the image processing apparatus 700 can be realized.

Further, according to this embodiment, as shown in FIGS. 4 and 5, the generation of the read clock CLK3 and the operation clock CLK4 is stopped if the sub scanning synchronization signal SG1 is in the negate state (before time t1) and it is possible to generate the read clock CLK3 and the operation clock CLK4 if the sub scanning synchronization signal SG1 is in the assert state (after time t1). Since no image data is input to the image processing apparatus 700 if the sub scanning synchronization signal SG1 is in the negate state, lower power consumption of the image processing apparatus 700 can be realized by stopping the generation of the read clock CLK3 and the operation clock CLK4. Thus, the read clock CLK3 and the operation clock CLK4 can be stopped before the image data of the first line is written in the line memory 51, wherefore lower power consumption of the image processing apparatus 700 can be realized.

According to this embodiment, a clock as a basis of the read clock CLK3 and that as a basis of the operation clock CLK4 are common (internal clock CLK2), the generation and non-generation of the read clock CLK3 are switched by the OR gate 73 (first OR gate) and the first mask signal, and the generation and non-generation of the operation clock CLK4 are switched by the OR gate 75 (second OR gate) and the second mask signal. Therefore, the generation and non-generation of the read clock CLK3 and the generation and non-generation of the operation clock CLK4 can be realized by a simple construction.

According to this embodiment, as shown in FIG. 4, the image data ImD is not input to the image processing apparatus 700 if the sub scanning synchronization signal SG1 is in the negate state (before time t1). Thus, the signal output device 71 outputs the first and second mask signals. Since this causes the generation of the operation clock CLK4 and the read clock CLK3 to be stopped, lower power consumption of the image processing apparatus 700 can be realized.

In this embodiment, as shown in FIGS. 4 and 5, the image data of one line determined to be a white line is not read from the line memory 51. However, it is also possible to read the image data of one line determined to be a white line from the line memory 51. In this mode, the image data of one line determined to be a white line is read from the line memory 51 and fed to the image processor 27. However, since the operation clock CLK4 is not generated, no image processings are performed on the image data of one line determined to be a white line in the image processor 27 and the white data is read from the white data storage 33 as in this embodiment. In this mode, the OR gate 73 shown in FIG. 3 and the generation of the output OP2 become unnecessary, and the internal clock CLK2 is input as the read clock CLK3 to the line processor 25.

Although the image data processed in the ASIC 11 is written in the DRAM 13 in this embodiment, it may be transferred to an ASIC in a subsequent stage.

This application is based on Japanese Patent application No. 2010-262316 filed in Japan Patent Office on Nov. 25, 2010, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image processing apparatus, comprising:
a line memory capable of writing and reading image data of one line;
a clock generator;
a write/read controller for controlling writing and reading of the image data of one line in and from the line memory, the write/read controller reads the image data of one line from the line memory using a read clock;
a white line determiner for determining whether or not an image corresponding to the image data of one line being written in the line memory by the write/read controller is a white line;
an image processor capable of performing a specified image processing on the image data of one line read from the line memory by the write/read controller;
a white data storage storing white data; and
an image processing controller for controlling to generate an operation clock used in the image processor and cause the image processor to perform the specified image processing for the image data of one line determined not to be a white line by the white line determiner and controlling to stop generating the operation clock and read the white data from the white data storage for the image data of one line determined to be a white line by the white line determiner,
the image processing controller generates the read clock for the image data of one line determined not to be a white line by the white line determiner and stops generating the read clock for the image data of one line determined to be a white line by the white line determiner, and
wherein the image processing controller includes:
a signal output device for outputting a first mask signal and a second mask signal for the image data of one line determined to be a white line by the white line determiner;
a first OR gate which is an OR gate to which a clock generated by the clock generator is input, outputs the clock as the read clock unless the first mask signal is input and does not output the read clock if the first mask signal is input; and
a second OR gate which is an OR gate to which the clock is input, outputs the clock as the operation clock unless the second mask signal is input and does not output the operation clock if the second mask signal is input.

2. An image processing apparatus according to claim 1, wherein:
there are a plurality of line memories;
the write/read controller executes a control to switch the readable line memory and the writable line memory line by line out of the plurality of line memories, a control to read the image data of one line from the readable line memory and a control to write the image data of the next line in the writable line memory; and
the image processing controller stops generating a read clock used to read the image data of one line for the image data of one line determined to be a white line by the white line determiner.

3. An image processing apparatus according to claim 1, wherein:
there are a plurality of line memories; and
the write/read controller executes a control to switch the readable line memory and the writable line memory line by line out of the plurality of line memories, a control to read the image data of one line from the readable line memory and a control to write the image data of the next line in the writable line memory.

4. An image processing apparatus according to claim 1, wherein:
the image processing controller stops generating a read clock used to read the image data of one line for the image data of one line determined to be a white line by the white line determiner.

5. An image processing apparatus according to claim 4, wherein:
the image processing controller stops generating the operation clock and the read clock if a sub scanning synchronization signal is in a negate state.

6. An image processing apparatus according to claim 5, wherein:
the signal output device outputs the first and second mask signals if a sub scanning synchronization signal is in a negate state.

7. An image processing apparatus according to claim 1, wherein:
the image data of one line are generated by a document reader for dividing a document into a plurality of lines along a main scanning direction, reading the document while relatively moving the document in a sub scanning direction and successively outputting the image data of one line to the line memory.

8. An image forming apparatus, comprising:
an image processing apparatus comprising:
a line memory capable of writing and reading image data of one line;
a clock generator;
a write/read controller for controlling writing and reading of the image data of one line in and from the line memory, the write/read controller reads the image data of one line from the line memory using a read clock;
a white line determiner for determining whether or not an image corresponding to the image data of one line being written in the line memory by the write/read controller is a white line;
an image processor capable of performing a specified image processing on the image data of one line read from the line memory by the write/read controller;
a white data storage storing white data; and
an image processing controller for controlling to generate an operation clock used in the image processor and cause the image processor to perform the specified image processing for the image data of one line determined not to be a white line by the white line determiner and controlling to stop generating the operation clock and read the white data from the white data storage for the image data of one line determined to be a white line by the white line determiner,
the image processing controller generates the read clock for the image data of one line determined not to be a white line by the white line determiner and stops generating the read clock for the image data of one line determined to be a white line by the white line determiner, and wherein the image processing controller includes:
a signal output device for outputting a first mask signal and a second mask signal for the image data of one line determined to be a white line by the white line determiner;
a first OR gate which is an OR gate to which a clock generated by the clock generator is input, outputs the clock as the read clock unless the first mask signal is input and does not output the read clock if the first mask signal is input; and
a second OR gate which is an OR gate to which the clock is input, outputs the clock as the operation clock unless the second mask signal is input and does not output the operation clock if the second mask signal is input; and
an image forming unit for forming an image on a sheet using image data of one page which is a collection of image data of a plurality of lines processed in the image processing apparatus.

9. An image processing method, comprising:
a first step of determining whether or not an image corresponding to image data of one line being written in a line memory is a white line;
a second step of writing the image data of one line in the line memory;
a third step of generating a read clock, reading the image data of one line written in the line memory in the second step using the read clock and performing a specified image processing on the read image data of one line using an operation clock when the image is judged not to be a white line in the first step; and
a fourth step of stopping the generation of the read clock, not reading the image data of one line written in the line memory and causing the specified image processing not to be performed on the image data of one line written in the line memory in the second step by stopping the generation of the operation clock and, instead, reading white data as the image data of one line when the image is judged to be a white line in the first step;
outputting a first mask signal and a second mask signal for the image data of one line determined to be a white line by the white line determiner;
inputting to a first OR gate a clock generated by the clock generator, outputting from the first OR gate the clock as the read clock unless the first mask signal is input and not outputting the read clock from the first OR gate if the first mask signal is input; and
inputting the clock to a second OR gate which is an OR gate to which the clock is input, outputting the clock from the second OR gate as the operation clock unless the second mask signal is input and not outputting the operation clock from the second OR gate if the second mask signal is input.

* * * * *